J. & G. D. Friese,
Ticket Punch,
N° 84,739. Patented Dec. 8, 1868.

Witnesses:
C. A. Pettit
J. K...

Inventor;
J and G. D. Friese
by Munn & Co
Attorneys

United States Patent Office.

JOHN FRIESE AND GEORG DANIEL FRIESE, OF BALTIMORE, MARYLAND, ASSIGNORS TO JOHN FRIESE, OF THE SAME PLACE.

Letters Patent No. 84,739, dated December 8, 1868.

IMPROVEMENT IN CONDUCTORS' PUNCHES.

The Schedule referred to in these Letters Patent and making part of the same.

*To all whom it may concern:*

Be it known that we, JOHN FRIESE and GEORG DANIEL FRIESE, of the city and county of Baltimore, and State of Maryland, have invented a new and improved Conductors' Punch; and we do hereby declare that the following is a full, clear, and exact description of the construction and operation of the same, reference being had to the accompanying drawings, making a part of this specification, in which—

Figure 1:
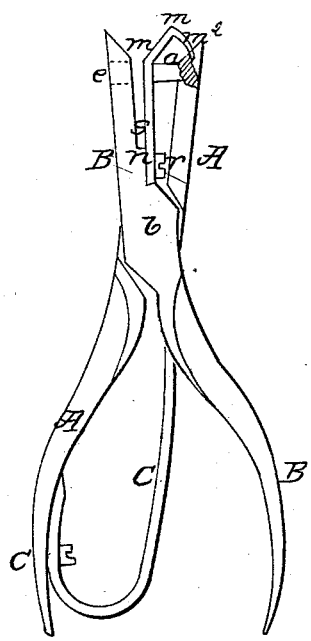
Figure 1 is a side view, a portion of one of the jaws having been broken away.
Figure 2:
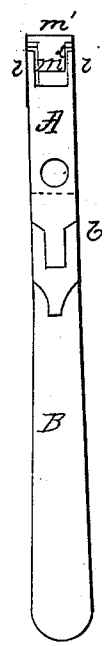
Figure 2 is an edge view.

The object of this invention is to so improve the common instrument for cutting eyelets in paper, leather, cloth, &c., that the spring that forces the jaws apart will not wear out, or get out of order so soon, while the piece punched out of the paper, leather, &c., will be more certainly and effectually removed from the tooth or cutter.

In the drawings—

A represents the jaw which supports the tooth or cutter $a$, and

B, the opposite jaw, having an opening, $e$, corresponding in shape to the cutting-end of the tooth $a$, the two jaws being crossed and pivoted together at $b$, and their ends, opposite to the tooth and eye, being fitted to be grasped and held easily in the hand.

To the jaw A, at $c$, is attached a bent spring, C, which presses against the opposite jaw, and serves to open them.

To the jaw B, at $n$, is attached a steel plate, M, extending out beyond the tooth $a$, then bending round over the extremity of jaw A, in the shape of a hook, as seen at $m\ m^1\ m^2$, and, by thus extending over the end of jaw A, preventing the two jaws from being opened so far as, in shutting again, to damage spring C, or wear it out too fast.

The plate M is provided with an opening, through which the tooth $a$ passes when the instrument is used, and as the jaws open, after cutting the eyelet, the tooth draws back through said opening, and causes the plate to scrape from it the piece of paper or other material punched out, and thus to clean the tooth and prepare it for another operation.

The plate M is fastened to jaw B by means of a screw-rivet, $r$, and can readily be removed. It rests upon a slightly-raised bed, $s$, so that a sufficient space shall be left between the body of it and the jaw B, to admit between them the leather, cloth, or other material to be operated upon.

The bent end, $m\ m^1$, serves not only as a part of the hook that extends over the end of the opposite jaw, but also as a guide to facilitate the insertion of the material to be punched.

The hook $m^2$, when the jaws are opened, comes in contact with the jaw A, between two slight projections or lugs, $i\ i$, at its extremity, which prevent the springing or twisting of the parts, and keep the instrument from getting out of order.

The tooth $a$ may be made detachable, and removable, if preferred, so that if it should get out of order, from any cause, it may be removed, and another inserted. To this end, it might be screwed into the jaw, or any other construction might be adopted which would answer the purpose as well.

Having thus described our invention,

What we claim as new, and desire to secure by Letters Patent, is—

In connection with the eyelet-cutting instrument, having the two jaws A and B, the tooth $a$, the opening $e$, and the spring C, the rigid plate M, when attached to the jaw B, upon a raised bed, $s$, and provided with the opening to receive the tooth $a$, and bent so as to hook over the end of jaw A, the several parts being constructed to operate together, in the manner and for the purposes herein set forth.

JOHN FRIESE.

Witnesses:
FRED'K LOEFFLER,
CHAS. A. PETTIT.

GEORG DANIEL FRIESE.

Witnesses:
HOWARD BOKEE,
CHAS. A. PETTIT.